United States Patent
Cady et al.

(10) Patent No.: US 6,680,361 B1
(45) Date of Patent: Jan. 20, 2004

(54) SHEAR THINNING ETHYLENE/α-OLEFIN INTERPOLYMERS AND THEIR PREPARATION

(75) Inventors: Larry Duane Cady, Houston, TX (US); Morgan Mark Hughes, Angleton, TX (US); Michael Kenneth Laughner, Lake Jackson, TX (US); Larry Alan Meiske, Baton Rouge, LA (US); Deepak Rasiklal Parikh, Lake Jackson, TX (US)

(73) Assignee: DuPont Dow Elastomers LLC, Wilmington, DE (US)

( * ) Notice: Subject to any disclaimer, the term of this patent is extended or adjusted under 35 U.S.C. 154(b) by 0 days.

(21) Appl. No.: 09/830,936
(22) PCT Filed: Nov. 2, 1999
(86) PCT No.: PCT/US99/25637
§ 371 (c)(1), (2), (4) Date: May 2, 2001
(87) PCT Pub. No.: WO00/26268
PCT Pub. Date: May 11, 2000

Related U.S. Application Data

(60) Provisional application No. 60/106,569, filed on Nov. 2, 1998.

(51) Int. Cl.$^7$ .............................. C08F 4/44; C08F 210/04
(52) U.S. Cl. ..................... 526/133; 526/160; 526/161; 526/348.6; 526/905; 526/916; 526/943; 502/152; 502/155
(58) Field of Search ................................ 502/152, 155; 526/348.6, 916, 161, 160, 943, 905, 133, 134

(56) References Cited

FOREIGN PATENT DOCUMENTS

| EP | 0 751 182 A1 | * | 1/1997 |
| WO | WO 96/07681 | * | 3/1996 |
| WO | WO 98/27103 | * | 6/1998 |

\* cited by examiner

*Primary Examiner*—Robert Harlan

(57) ABSTRACT

Shear-thinning ethylene/α-olefin and ethylene/α-olefin/diene monomer interpolymers that do not include a traditional branch-inducing monomer such as norbornadiene are prepared at an elevated temperature in an atmosphere that has little or no hydrogen using a constrained geometry complex catalyst and an activating cocatalyst.

9 Claims, No Drawings

SHEAR THINNING ETHYLENE/α-OLEFIN INTERPOLYMERS AND THEIR PREPARATION

This application is filed under 35 USC 371 to PCT/US99/25637 filed Nov. 2, 1999, which claims benefit of provisional application No. 60/106,569 filed Nov. 2, 1998

BACKGROUND OF THE INVENTION

This invention relates to shear thinning ethylene/α-olefin (EAO) interpolymers. The interpolymers have a Processing Rheology Ratio (PRR) of at least 4, an indication that long chain branching (LCB) is present. The interpolymers attain such a PRR in the absence of a conventional LCB monomer such as norbornadiene (NBD). The alpha-olefin (α-olefin) suitably contains three to 20 carbon atoms ($C_3$–$C_{20}$) and is preferably propylene ($C_3$), 1-butene, 1-hexene or 1-octene ($C_8$). The interpolymers desirably include a diene (diolefin) monomer, preferably a nonconjugated diene monomer such as 5-ethylidene-2-norbornene (ENB). The diene-containing EAO interpolymers are generically referred to as "EAODM interpolymers". EAO and EAODM interpolymers are collectively referred to as "EAO(D)M interpolymers". This invention also relates to preparation of such interpolymers, compositions that include such interpolymers and articles of manufacture that include at least one part or portion fabricated from such interpolymers or compositions.

SUMMARY OF THE INVENTION

A first aspect of the invention is a shear thinning EAO(D)M interpolymer, the interpolymer having polymerized therein ethylene, at least one α-olefin monomer and, optionally, at least one diene monomer and being characterized by a PRR of at least four. The interpolymer desirably has an ethylene ($C_2$) content of from 20 to 95 weight percent (wt %), an α-olefin content of from 80 to 5 wt %, the α-olefin being a $C_{3-20}$ α-olefin and, optionally, a diene monomer content within a range of from greater than 0 to 25 wt %, all percentages being based on interpolymer weight and totaling 100 wt %. The EAO(D)M interpolymer attains such a PRR in the absence of NBD or any other conventional LCB monomer.

Interpolymer viscosity is conveniently measured in poise (dyne-second/square centimeter (d-sec/cm$^2$)) at shear rates within a range of 0.1–100 radian per second (rad/sec) and at 190° C. under a nitrogen atmosphere using a dynamic mechanical spectrometer such as a RMS-800 or ARES from Rheometrics. The viscosities at 0.1 rad/sec and 100 rad/sec may be represented, respectively, as $V_{0.1}$ and $V_{100}$ with a ratio of the two referred to as RR and expressed as $V_{0.1}/V_{100}$. PRR=RR+[3.82–interpolymer Mooney Viscosity ($ML_{1+4}$ at 125° C.)]×0.3.

A second aspect of the invention is a process for preparing the EAO(D)M interpolymer of the first aspect, the process comprising: contacting ethylene, at least one α-olefin monomer and, optionally, at least one diene monomer with a catalyst and an activating cocatalyst under conditions sufficient to attain an ethylene conversion of at least 60 weight percent, the conditions including a temperature of at least 70° C., more preferably at least 80° C., and, optionally, in the presence of an effective amount of hydrogen, the amount being sufficient to maintain an interpolymer PRR of at least 4, the catalyst being at least one constrained geometry metal complex. The α-olefin monomer is suitably a $C_{3-20}$ α-olefin monomer. The process is especially useful for the solution polymerization of EAO(D)M interpolymers wherein the diene or polyene is ENB, 1,4-hexadiene or a similar nonconjugated diene or a conjugated diene such as 1,3-pentadiene. The diene is preferably ENB or 7-methyl-1,6-octadiene. As in the first aspect, the interpolymer PRR is achieved in the absence of a conventional LCB monomer.

A third aspect of the invention is a polymer blend composition that comprises the interpolymer of the first aspect and an amount of a crystalline polyolefin resin, desirably a propylene polymer or copolymer, preferably polypropylene (PP). The interpolymer is desirably present in an amount of less than 50 parts by weight (pbw) and the crystalline polyolefin resin is desirably present in an amount of more than 50 pbw. When the interpolymer is an EAODM interpolymer, the polymer blend is referred to as a thermoplastic elastomer or TPE. When the interpolymer is an EAO interpolymer, the polymer blend is referred to as a thermoplastic polyolefin or TPO.

A fourth aspect of the invention is a polymer blend composition that comprises an interpolymer of the first aspect that is at least partially crosslinked (also referred to as cured or vulcanized) and a crystalline polyolefin resin, again desirably a propylene polymer or copolymer, preferably PP. The interpolymer is desirably present in an amount of from 40 to 90 pbw and the crystalline polyolefin is desirably present in an amount of from 60 to 10 pbw. The interpolymer is preferably crosslinked sufficiently to provide a gel content of at least 70%, based on interpolymer weight.

In both the third and fourth aspects, the amounts of interpolymer and crystalline polyolefin resin are based on total weight of interpolymer plus crystalline polyolefin and, when added together, equal 100 pbw.

DESCRIPTION OF PREFERRED EMBODIMENTS

All references to the Periodic Table of the Elements herein refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

Neat EAO(D)M interpolymers of the present invention have three distinct characteristics. One is a PRR of at least four. The PRR is desirably within a range of from 4 to 350, preferably from 4 to 250, most preferably from 8 to 150. A second is a Mooney Viscosity or MV ($ML_{1+4}$ @125° C., ASTM D1646-94) within a range of from 0.5 to 200, preferably from 5 to 120, and more preferably from 10 to 85. A third is a molecular weight distribution (MWD or $M_w/M_n$) within a range of from 2 to 5, preferably from 2.0 to 3.8, and more preferably from 2.2 to 3.2. Given these characteristics, preferred EAO(D)M interpolymers have a MWD of at least 2.5 and a PRR of at least 8. Preferred EAODM interpolymers have a MWD of at least 2.2, a MV of at least 15 and a PRR of at least 10. When the EAO is a $C_2$/$C_8$ (EO) copolymer, the MWD is at least 2.3, the MV is at least 5 and the PRR is preferably greater than 4.

In solution polymerization processes, a known and predominant mode of controlling molecular weight is chain termination via thermal termination, hydrogen termination or both. It is believed that thermal termination yields a chain end with a reactive vinyl group whereas hydrogen chain termination yields a non-reactive saturated end group. In most cases, thermal termination competes with hydrogen termination. It is also believed that the formation of reactive vinyl end groups and subsequent reinsertion thereof into a growing polymer backbone under the process conditions detailed above yields a polymer product with in situ LCB. As such, reactor condition combinations that favor forming reactive vinyl end groups, such as little or no hydrogen and elevated polymerization temperatures, are believed to favor incorporation of the reactive vinyl end groups which in turn leads to an increased LCB level as reflected by a PRR increase.

The EAO(D)M interpolymers of the present invention have polymerized therein $C_2$, at least one $C_{3-20}$ α-olefin (ethylenically unsaturated) monomer and, optionally, a $C_{4-40}$ diene monomer (other than NBD or another conventional LCB monomer). The α-olefin may be either an aliphatic or an aromatic compound and may contain vinylic unsaturation or a cyclic compound, such as styrene, p-methyl styrene, cyclobutene, cyclopentene, and norbornene, including norbornene substituted in the 5 and 6 position with $C_{1-20}$ hydrocarbyl groups. The α-olefin is preferably a $C_{3-20}$ aliphatic compound, more preferably a $C_{3-16}$ aliphatic compound. Preferred ethylenically unsaturated monomers include 4-vinylcyclohexene, vinylcyclohexane, and $C_{3-10}$ aliphatic α-olefins (especially ethylene, propylene, isobutylene, 1-butene, 1-pentene, 1-hexene, 3-methyl-1-pentene, 4-methyl-1-pentene, 1-octene, 1-decene and 1-dodecene). A more preferred $C_{3-10}$ aliphatic α-olefin is selected from the group consisting of propylene, 1-butene, 1-hexene and 1-octene.

The interpolymers of the present invention have a $C_2$ content of from 20 up to 95 wt %, more preferably 30 to 93 wt %, and most preferably 35 to 90 wt %. The interpolymers also contain at least one α-olefin, other than $C_2$, at a level of 5 to 80 wt %, more preferably at 7 to 70 wt %, and most preferably from 10 to 65 wt %. Finally, the interpolymers may include a non-conjugated diene. When the interpolymers include a non-conjugated diene, the non-conjugated diene content is preferably from greater than 0 to 25 wt % or higher, more preferably from greater than 0 to 15 wt %, and most preferably from greater than 0 to 10 wt %. All percentages are based on interpolymer weight. If desired, more than one diene may be incorporated simultaneously, for example 1,4-hexadiene and ENB, with total diene incorporation within the limits specified above.

The $C_{4-40}$ diolefin or diene monomer is desirably a non-conjugated diolefin that is conventionally used as a cure site for cross-linking. The nonconjugated diolefin can be a $C_{6-15}$ straight chain, branched chain or cyclic hydrocarbon diene. Illustrative nonconjugated dienes are straight chain acyclic dienes such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes such as tetrahydroindene, methyl tetrahydroindene; alkenyl, alkylidene, cycloalkenyl and cycloalkylidene norbornenes such as 5-methylene-2-norbornene (MNB), ENB, 5-vinyl-2-norbornene, 5-propenyl-2-norbornene, 5-isopropylidene-2-norbornene, 5-(4-cyclopentenyl)-2-norbornene and 5-cyclohexylidene-2-norbornene. The diene is preferably a nonconjugated diene selected from the group consisting of ENB and 1,4-hexadiene, 7-methyl-1,6-octadiene, more preferably, ENB. The diolefin may, however, be a conjugated diene selected from the group consisting of 1,3-pentadiene, 1,3-butadiene, 2-methyl-1,3-butadiene, 4-methyl-1,3-pentadiene, or 1,3-cyclopentadiene. The EAODM diene monomer content, whether it comprise a conjugated diene, a non-conjugated diene or both, falls within the limits specified above for non-conjugated dienes.

Although preferred interpolymers are substantially free of any diene monomer that typically induces LCB, one may include such a monomer if costs are acceptable and desirable interpolymer properties, such as processibility, tensile strength and elongation, do not degrade to an unacceptable level. Such diene monomers include dicyclopentadiene, NBD, methyl norbornadiene, vinyl-norbornene, 1,6-octadiene, 1,7-octadiene, and 1,9-decadiene. When added, such monomers are added in an amount within a range of from greater than zero to 3 wt %, more preferably from greater than zero to 2 wt %, based on interpolymer weight.

The interpolymers of the present invention may be used in preparing any of a variety of articles or manufacture or their component parts or portions. For purposes of illustration only, and not by way of limitation, such articles may be selected from the group consisting of wire and cable components, electrical insulation, belts, hoses, tubes, gaskets, membranes, molded goods, extruded parts, automotive parts, adhesives, tires and tire sidewalls.

The interpolymers of the present invention may be used as is, but preferably find use as a component of a compound. A compound typically comprises at least one polymer in admixture with at least one additive selected from the group consisting of fillers, fibers, plasticizers, oils, colorants, stabilizers, foaming agents, retarders, accelerators, cross-linking agents and other conventional additives. The interpolymers of the present invention preferably comprise at least part of the polymer content of such a compound.

Interpolymers, and compounds containing such an interpolymer, may be converted into a finished article of manufacture by any one of a number of conventional processes and apparatus. Illustrative processes include extrusion, calendering, injection molding, compression molding, fiber spinning, and other typical thermoplastic processes.

The interpolymers of the present invention may also serve as a base polymer in preparing a graft polymer. Any unsaturated organic compound that contains at least one ethylenic unsaturation (at least one double bond), and will graft to an interpolymer of the present invention can be used to modify such an interpolymer. Illustrative unsaturated compounds include vinyl ethers, vinyl-substituted heterocyclic compounds, vinyl oxazolines, vinyl amines, vinyl epoxies, unsaturated epoxy compounds, unsaturated carboxylic acids, and anhydrides, ethers, amines, amides, succinimides or esters of such acids. Representative compounds include maleic, fumaric, acrylic, methacrylic, itaconic, crotonic, α-methyl crotonic, and cinnamic acid and their anhydride, ester or ether derivatives, vinyl-substituted alkylphenols and glycidyl methacrylates. Suitable unsaturated amines include those of aliphatic and heterocyclic organic nitrogen compounds that contain at least one double bond and at least one amine group (at least one primary, secondary or tertiary amine). Maleic anhydride is the preferred unsaturated organic compound. Grafted interpolymers may be used in a number of applications, only one of which is as a component of an oleaginous compound. The use of a grafted EPDM interpolymer in oleaginous compositions, procedures used to prepare such grafted interpolymers and various graft moieties are disclosed in WO 97/32946 (based on US priority documents No. 60/013,052 of Mar. 8, 1996 and No. 60/024,913 of Aug. 30, 1996), the relevant teachings of which, or the corresponding equivalent United States application, are incorporated herein by reference.

As noted in the third and fourth aspects, the interpolymers may be used in preparing a TPE, a TPO or a TPV. A number of references provide general procedures for preparing a TPE. One such reference is EP 751,182, published Jan. 2, 1997, the relevant teachings of which are incorporated herein by reference.

Olefins that may be used to prepare crystalline polyolefin resins include one or more of ethylene, propylene, 1-butene, 1-pentene, 1-hexene, 1-octene, 1-decene, 2-methyl-1-propene, 3-methyl-1-pentene, and 4-methyl-1-pentene. The crystalline polyolefin is desirably a PP homopolymer or a copolymer of propylene with an α-olefin such as ethylene, 1-butene, 1-hexene or 4-methyl-1-pentene or a blend of a homopolymer and a copolymer. The α-olefin is preferably ethylene. The crystalline polyolefins may be prepared by any suitable process such as random polymerization or block polymerization. Various forms such as isotactic and syndiotactic may also be used. Typical commercially available crystalline resins include PP homopolymer and propylene/ethylene (P/E) copolymer resins. Certain of the olefin copolymer resins, especially propylene copolymers such as the P/E copolymers, may be referred to as "semi-crystalline" resins. The use of "crystalline" to describe polyolefin resins is meant to be broad enough to include such semi-crystalline resins. The crystalline resins may be used singly or in combination.

Preparation of PP homopolymers and P/E copolymers also involves the use of Ziegler catalysts such as a titanium trichloride in combination with aluminum diethylmonochloride, as described by Cecchin, U.S. Pat. No. 4,177,160. Polymerization processes used to produce PP include the slurry process, which is run at about 50–90° C. and 0.5–1.5 MPa (5–15 atm), and both the gas-phase and liquid-monomer processes in which extra care must be given to the removal of amorphous polymer. Ethylene may be added to the reaction to form a polypropylene with ethylene blocks. PP resins may also be prepared by using any of a variety of metallocene, single site and constrained geometry catalysts together with their associated processes.

A number of patents and publications disclose constrained geometry metal complexes and methods for their preparation. An illustrative, but not exhaustive, list includes EP-A-416,815 (U.S. Ser. No. 545,403, filed Jul. 3, 1990); EP-A-468,651 (U.S. Ser. No. 547,718, filed Jul. 3, 1990); EP-A-514,828 (U.S. Ser. No. 702,475, filed May 20, 1991); EP-A-520,732 (U.S. Ser. No. 876,268, filed May 1, 1992) and WO93/19104 (U.S. Ser. No. 8,003, filed Jan. 21, 1993), as well as U.S. Pat. Nos. 5,055,438, 5,057,475, 5,096,867, 5,064,802, 5,132,380, 5,470,993, 5,556,928, 5,624,878, WO95/00526, and US Provisional Application No. 60-005913. U.S. Ser. No. 592,756, filed Jan. 26, 1996, WO95/14024, WO 98/27103 (based on US priority documents No. 60/034,817 of Dec. 19, 1996 and Ser. No. 08/949,505 of Oct. 14, 1997) and PCT/US97/07252 (filed Apr. 30, 1997) disclose various substituted indenyl-containing metal complexes. The relevant teachings of all of the foregoing patents and publications, or of the corresponding equivalent United States application, are hereby incorporated by reference.

Broadly speaking, suitable metal complexes for use include any complex of a metal of Groups 3–10 of the Periodic Table of the Elements capable of being activated to polymerize addition polymerizable compounds, especially olefins by the present activators. Examples include Group 10 diimine derivatives corresponding to the formula:

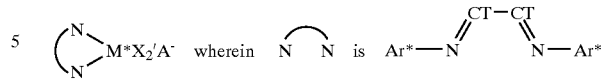

M* is Ni(II) or Pd(II); X' is halo, hydrocarbyl, or hydrocarbyloxy; Ar* is an aryl group, especially 2,6-diisopropylphenyl or aniline group; CT-CT is 1,2-ethanediyl, 2,3-butanediyl, or form a fused ring system wherein the two T groups together are a 1,8-naphthanediyl group; and A⁻ is the anionic component of the foregoing charge separated activators.

Similar complexes to the foregoing are also disclosed by M. Brookhart, et al., in *J. Am. Chem. Soc.*, 118, 267–268 (1996) and *J. Am. Chem. Soc.*, 117, 6414–6415 (1995), as being active polymerization catalysts especially for polymerization of α-olefins, either alone or in combination with polar comonomers such as vinyl chloride, alkyl acrylates and alkyl methacrylates.

Additional complexes include derivatives of Group 3, 4, or Lanthanide metals containing from 1 to 3π-bonded anionic or neutral ligand groups, which may be cyclic or non-cyclic delocalized π-bonded anionic ligand groups. The term "π-bonded" means that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyloxy, hydrocarbylsulfide, dihydrocarbylamino, and hydrocarbyl-substituted metalloid radicals wherein the metalloid is selected from Group 14 of the Periodic Table of the Elements, and such hydrocarbyl-, halohydrocarbyl-, hydrocarbyloxy-, hydrocarbylsulfide-, dihydrocarbylamino- or hydrocarbyl-substituted metalloid-radicals that are further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition, two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, e.g. amide, phosphide, ether or thioether groups bonded to the transition metal or Lanthanide metal, and bonded to the hydrocarbyl group or to the hydrocarbyl-substituted metalloid containing group.

Exemplary of such π-bonded anionic ligand groups are conjugated or nonconjugated, cyclic or non-cyclic dienyl groups, allyl groups, boratabenzene groups, and arene groups. Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups and s-indacenyl, as well as $C_{1-10}$ hydrocarbyl-substituted, $C_{1-10}$ hydrocarbyloxy-substituted, di($C_{1-10}$ hydrocarbyl)amino-substituted, or tri($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, s-indacenyl, 2-methyl-s-indacenyl, and tetrahydroindenyl.

The boratabenzenes are anionic ligands that are boron-containing analogues to benzene. They are previously known in the art having been described by G. Herberich, et al., in *Organometallics*, 1995, 14, 1, 471–480.

A first preferred constrained geometry catalyst corresponds to formula II:

II wherein M is titanium, zirconium or hafnium in the +2, +3 or +4 formal oxidation state; A' is a substituted indenyl group substituted in at least the 2 position with a group selected from hydrocarbyl, fluoro-substituted hydrocarbyl, hydrocarbyloxy-substituted hydrocarbyl, dialkylamino-substituted hydrocarbyl, silyl, germyl and mixtures thereof, said group containing up to 40 nonhydrogen atoms, and said A' further being covalently bonded to M by means of a divalent Z group; Z is a divalent moiety bound to both A' and M via σ-bonds, said Z comprising boron, or a member of Group 14 of the Periodic Table of the Elements, and also comprising nitrogen, phosphorus, sulfur or oxygen; X is an anionic or dianionic ligand group having up to 60 atoms exclusive of the class of ligands that are cyclic, delocalized, π-bound ligand groups; X' independently each occurrence is a neutral Lewis base ligating compound, having up to 20 atoms; p is 0, 1 or 2, and is two less than the formal oxidation state of M, with the proviso that when X is a dianionic ligand group, p is 1; and q is 0, 1 or 2.

Additional preferred catalysts or coordination complexes are disclosed in previously incorporated WO 98/27103 and PCT/US97/07252. PCT/US97/07252, especially at page 4, line 34 through page 16, line 36, describes preferred coordination complexes such as those reproduced below as formulae III, IVA and IVB. Formula I below is a variation of formula II at page 7 of PCT/US97/07252.

The catalysts desirably include metal coordination complexes that correspond to formula I:

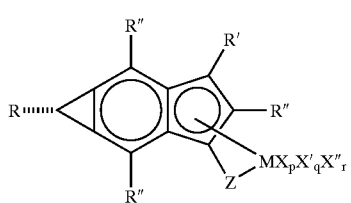

(I)

where M is defined as in formula II above; R' and R" are independently each occurrence hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, -silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylene-phosphino-substituted hydrocarbyl, or hydrocarbylsulfido-substituted hydrocarbyl, said R' or R" group having up to 40 nonhydrogen atoms, and optionally two or more of the foregoing groups may together form a divalent derivative; R'" is a divalent hydrocarbylene- or substituted hydrocarbylene group forming a fused system with the remainder of the metal complex, said R'" containing from 1 to 30 nonhydrogen atoms; Z is a divalent moiety, or a moiety comprising one σ-bond and a neutral two electron pair able to form a coordinate-covalent bond to M, said Z comprising boron, or a member of Group 14 of the Periodic Table of the Elements, and also comprising nitrogen, phosphorus, sulfur or oxygen; X is a monovalent anionic ligand group having up to 60 atoms exclusive of the class of ligands that are cyclic, delocalized, π-bound ligand groups; X' independently each occurrence is a neutral ligating compound having up to 20 atoms; X" is a divalent anionic ligand group having up to 60 atoms; p is zero, 1, 2, or 3; q is zero, 1 or 2, and r is zero or 1.

The above complexes may exist as isolated crystals optionally in pure form or as a mixture with other complexes, in the form of a solvated adduct, optionally in a solvent, especially an organic liquid, as well as in the form of a dimer or chelated derivative thereof, wherein the chelating agent is an organic material such as ethylenediaminetetraacetic acid (EDTA).

In the metal complexes defined in formulae I and II, preferred X' groups are carbon monoxide; phosphines, especially trimethylphosphine, triethylphosphine, triphenylphosphine and bis(1,2-dimethylphosphino)ethane; $P(OR)_3$, wherein R is $C_{1-20}$ hydrocarbyl; ethers, especially tetrahydrofuran; amines, especially pyridine, bipyridine, tetramethylethylenediamine (TMEDA), and triethylamine; olefins; and neutral conjugated $C_{4-40}$ dienes. Complexes including such neutral diene X' groups are those wherein the metal is in the +2 formal oxidation state.

The catalysts preferably include coordination complexes that correspond to formula III:

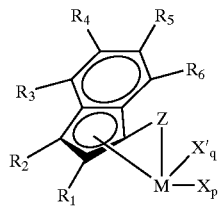

Formula III wherein $R_1$ and $R_2$, independently are groups selected from hydrogen, hydrocarbyl, perfluoro substituted hydrocarbyl, silyl, germyl and mixtures thereof, said group containing up to 20 non-hydrogen atoms, with the proviso that at least one of $R_1$ or $R_2$ is not hydrogen; $R_3$, $R_4$, $R_5$, and $R_6$ independently are groups selected from hydrogen, hydrocarbyl, perfluoro substituted hydrocarbyl, silyl, germyl and mixtures thereof, said group containing up to 20 non-hydrogen atoms; M is titanium, zirconium or hafnium; Z is a divalent moiety comprising boron, or a member of Group 14 of the Periodic Table of the Elements, and also comprising nitrogen, phosphorus, sulfur or oxygen, said moiety having up to 60 non-hydrogen atoms; p is 0, 1 or 2; q is zero or one; with the proviso that: when p is 2, q is zero, M is in the +4 formal oxidation state, and X is an anionic ligand selected from the group consisting of halide, hydrocarbyl, hydrocarbyloxy, di(hydrocarbyl)amido, di(hydrocarbyl) phosphido, hydrocarbylsulfido, and silyl groups, as well as halo-, di(hydrocarbyl)amino-, hydrocarbyloxy- and di(hydrocarbyl)phosphino-substituted derivatives thereof, said X group having up to 20 non-hydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or nonconjugated diene, optionally substituted with one or more hydrocarbyl groups, said X' having up to 40 carbon atoms and forming a π-complex with M.

A most preferred coordination complex, (t-butylamido)-dimethyl($\eta^5$-2-methyl-s-indacen-1-yl)silanetitanium (II) 1,3-pentadiene, has two isomers, sometimes referred to as geometric isomers, represented by Formulae IVA and IVB.

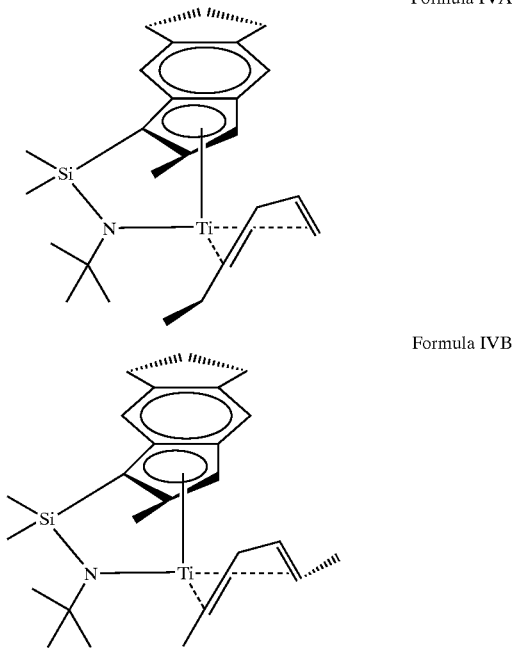

Formula IVA

Formula IVB

Specific examples of coordination complexes are detailed in PCT/US 97/07252, previously incorporated by reference, at page 10, line 3 through page 16, line 36. The coordination complex is preferably selected from the group consisting of (t-butylamido)dimethyl($\eta^5$-2-methyl-s-indacen-1-yl) silanetitanium (II) 2,4-hexadiene, (t-butylamido)-dimethyl ($\eta^5$-2-methyl-s-indacen-1-yl)silanetitanium (IV) dimethyl, (t-butylamido)-dimethyl($\eta^5$-2,3-dimethylindenyl) silanetitanium (II) 1,4-diphenyl-1,3-butadiene; (t-butyl-amido)-dimethyl($\eta^5$-2,3-dimethyl-s-indacen-1-yl) silanetitanium (IV) dimethyl, and (t-butylamido)-dimethyl ($\eta^5$-2-methyl-s-indacen-1-yl)silanetitanium (II) 1,3-pentadiene. Preferred members of this group include: (t-butylamido)-dimethyl($\eta^5$-2-methyl-s-indacen-1-yl) silane-titanium (IV) dimethyl, (t-butylamido)dimethyl($\eta^5$-2-methylindenyl)-silanetitanium (II) 2,4-hexadiene and (t-butylamido)-dimethyl($\eta^5$-2-methyl-s-indacen-1-yl) silanetitanium (II) 1,3-pentadiene. The most preferred coordination complex is and (t-butylamido)-dimethyl($\eta^5$-2-methyl-s-indacen-1-yl)silanetitanium (II) 1,3-pentadiene.

Other preferred metal complexes include derivatives of any transition metal including Lanthanides, but preferably of Group 3, 4, or Lanthanide metals which are in the +2, +3, or +4 formal oxidation state meeting the previously mentioned requirements. Preferred compounds include metal complexes (metallocenes) containing from 1 to 3π-bonded anionic ligand groups, which may be cyclic or noncyclic delocalized π-bonded anionic ligand groups. Exemplary of such π-bonded anionic ligand groups are conjugated or nonconjugated, cyclic or non-cyclic dienyl groups, allyl groups, and arene groups. Such other preferred metal complexes correspond to the formula: $L_lMX_mX'_nX''_p$, or a dimer thereof, wherein: L is an anionic, delocalized, π-bonded group that is bound to M, containing up to 50 atoms not counting hydrogen, optionally two L groups may be joined together through one or more substituents thereby forming a bridged structure, and further optionally one L may be bound to X through one or more substituents of L; M is a metal of Group 4 of the Periodic Table of the Elements in the +2, +3 or +4 formal oxidation state; X is an optional, divalent substituent of up to 50 non-hydrogen atoms that together with L forms a metallocycle with M; X' is an optional neutral Lewis base having up to 20 non-hydrogen atoms; X" each occurrence is a monovalent, anionic moiety having up to 40 non-hydrogen atoms, optionally, two X" groups may be covalently bound together forming a divalent dianionic moiety having both valences bound to M, or form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality; l is 1 or 2; m is 0 or 1; n is a number from 0 to 3; p is an integer from 0 to 3; and the sum, l+m+p, is equal to the formal oxidation state of M. A variation of such complexes has each occurrence of X" containing up to 20 non-hydrogen atoms, two X" groups together forming a neutral C5-30 conjugated diene, m=1 and p being 1 or 2.

Preferred divalent X substituents include groups containing up to 30 atoms not counting hydrogen comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

Such other preferred complexes include those containing either one or two L groups. The latter complexes include those containing a bridging group linking the two L groups. Preferred bridging groups are those corresponding to the formula $(ER^*_2)_x$ wherein E is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, benzyl, tert-butyl or phenyl.

Examples of the foregoing bis(L) containing complexes are compounds corresponding to the formulae V and VI:

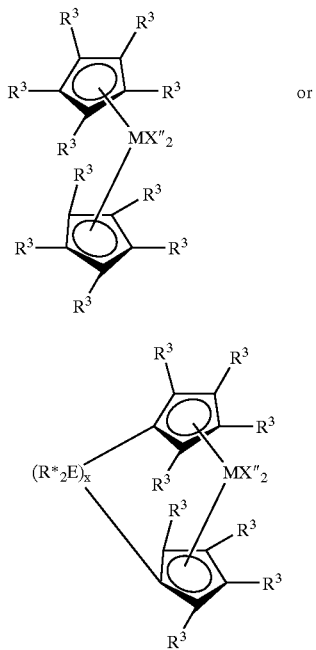

wherein: M is titanium, zirconium or hafnium, preferably zirconium or hafnium, in the +2 or +4 formal oxidation state; $R^3$ in each occurrence independently is selected from the group consisting of hydrogen, hydrocarbyl, dihydrocarbylamino, hydrocarbyleneamino, silyl, germyl, cyano, halo and combinations thereof, said $R^3$ having up to 20 atoms not counting hydrogen, or adjacent $R^3$ groups together form a divalent derivative thereby forming a fused ring system, and X" independently each occurrence is an anionic ligand group of up to 40 atoms not counting hydrogen, or two X" groups together form a divalent anionic ligand group of up to 40 atoms not counting hydrogen or together are a conjugated diene having from 4 to 30 atoms not counting hydrogen forming a π-complex with M, whereupon M is in the +2 formal oxidation state, and R*, E and x are as previously defined.

The foregoing metal complexes are especially suited for the preparation of polymers having stereoregular molecular structure. In such capacity it is preferred that the complex possess $C_2$ symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem*, 232, 233–47, (1982).

Exemplary bridged ligands containing two π-bonded groups are: (dimethylsilyl-bis-cyclopentadienyl), (dimethylsilyl-bis-methylcyclopentadienyl), (dimethylsilyl-bis-ethylcyclopentadienyl, (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1,1,2,2-tetramethyl-1,2-disilyl-bis-cyclopentadienyl), (1,2-bis(cyclopentadienyl) ethane, and (isopropylidene-cyclopentadienyl-fluorenyl).

Preferred X" groups are selected from hydride, hydrocarbyl, silyl, germyl, halohydrocarbyl, halosilyl, silyl-hydrocarbyl and aminohydrocarbyl groups, or two X" groups together form a divalent derivative of a conjugated diene or else together they form a neutral, π-bonded, conjugated diene.

Preferred constrained geometry metal complexes, also referred to as Group 4 metal coordination complexes, that correspond to Formula VII below may be found in previously incorporated U.S. Pat. Nos. 5,470,993, 5,556,928 and 5,624,878. See, e.g., U.S. Pat. No. 5,624,878 at column 1, line 61 through column 3, line 42 and column 6, line 14 through column 7, line 46.

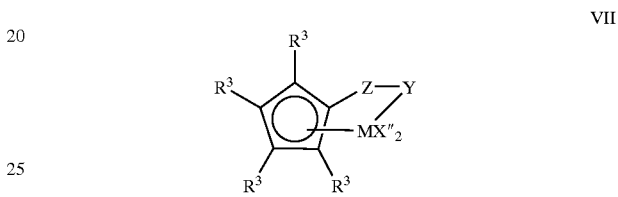

wherein: M is titanium or zirconium in the +2 or +4 formal oxidation state; $R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system; each X" is a halo, hydrocarbyl, hydrocarbyloxy or silyl group, said group having up to 20 atoms not counting hydrogen, or two X" groups together form a $C_{5-30}$ conjugated diene; Y is —O—, —S—, —NR*—, —PR*—; and Z is $SiR*_2$, $CR*_2$, $SiR*_2SiR*_2$, $CR*_2CR*_2$, $CR*=CR*$, $CR*_2SiR*_2$, or $GeR*_2$, wherein: R* is as previously defined.

The foregoing delocalized π-bonding groups, metal complexes containing the same and catalyst compositions based thereon, are more fully disclosed in the following publications: U.S. Pat. Nos. 5,703,187, 5,064,802, 5,321,106, 5,374,696, 5,470,993, 5,624,878, 5,556,928, 5,486,632, 5,541,349, 5,495,036, 5,527,929, 5,616,664, WO 97/15583, WO97/35864, WO98/06727, and WO98/27103, the teachings of which, or of the corresponding equivalent United States application, are incorporated herein by reference.

Illustrative Group 4 metal complexes may be found in U.S. Pat. No. 5,624,878 at column 9, line 9 through column 13, line 59. Some of those complexes include the following: (tert-butylamido)-(tetramethyl-$\eta^5$-cyclopentadienyl) dimethylsilanetitanium dichloride, (tert-butylamido) (tetramethyl-$\eta^5$-cyclopentadienyl)dimethylsilanetitanium dimethyl, (tert-butylamido)(tetramethyl-$\eta^5$-cyclopentadienyl)-1,2-ethanediyltitanium dimethyl, (tert-butylamido)(hexamethyl-$\eta^5$-indenyl)-dimethylsilanetitanium dimethyl, (tert-butylamido) (tetramethyl-$\eta^5$-cyclopentadienyl)dimethylsilane titanium (III) 2-(dimethylamino)benzyl; (tert-butylamido) (tetramethyl-$\eta^5$-cyclopentadienyl)-dimethylsilanetitanium (III) allyl, (tert-butylamido)(tetramethyl-$\eta^5$-cyclopentadienyl)-dimethyl-silanetitanium (II) 1,4-diphenyl-1,3-butadiene, (tert-butylamido)(2-methylindenyl) dimethyl-silanetitanium (II) 1,4-diphenyl-1,3-butadiene, (tert-butylamido)(2-methylindenyl)dimethyl-silanetitanium (IV) 1,3-butadiene, (tert-butylamido)(2,3-dimethylindenyl)dimethylsilanetitanium (II) 1,4-diphenyl-1,3-butadiene, (tert-butylamido)(2,3-dimethylindenyl)dimethylsilanetitanium (IV) 1,3-butadiene, (tert-butylamido)(2,3-dimethylindenyl)-dimethylsilanetitanium (II) 1,3-pentadiene, (tert-butylamido)(2-methylindenyl)dimethylsilanetitanium (II) 1,3-pentadiene, (tert-butylamido)(2-methylindenyl)dimethylsilanetitanium (IV) dimethyl, (tert-butylamido)(2-methyl-4-phenylindenyl)-dimethylsilanetitanium (II) 1,4-diphenyl-1,3-butadiene, (tert-butylamido)(2-methyl-4-phenylindenyl)-dimethlysilanetitanium (II) 1,3-pentadiene, (tert-butylamido)(tetramethyl-$\eta^5$-cyclopentadienyl)-dimethylsilanetitanium (IV) 1,3-butadiene, (tert-butylamido)(tetramethyl-$\eta^5$-cyclopentadienyl)-dimethylsilanetitanium (II) 1,4-dibenzyl-1,3-butadiene, (tert-butylamido)-(tetramethyl-$\eta^5$-cyclopentadienyl)dimethyl-silanetitanium (II) 2,4-hexadiene, (tert-butylamido)(tetramethyl-$\eta^5$-cyclopentadienyl)-dimethylsilanetitanium (II) 3-methyl-1,3-pentadiene, (tert-butylamido)(2,4-dimethyl-1,3-pentadien-2-yl)dimethylsilanetitaniumdimethyl, (tert-butylamido)(1,1-dimethyl-2,3,4,9,10-$\eta$-1,4,5,6,7,8-hexahydronaphthalen-4-yl)dimethyl-silanetitaniumdimethyl, (tert-butylamido)(1,1,2,3-tetramethyl-2,3,4,9,10-$\eta$-1,4,5,6,7,8-hexahydronaphthalen-4-yl)dimethylsilanetitaniumdimethyl, (tert-butylamido)(tetramethyl-cyclopentadienyl)-dimethylsilanetitanium 1,3-pentadiene, (tert-butylamido)(3-(N-pyrrolidinyl)inden-1-yl)dimethylsilanetitanium 1,3-pentadiene, (tert-butylamido)(2-methyl-s-indacen-1-yl)dimethylsilanetitanium 1,3-pentadiene, (tert-butylamido)(2-methyl-s-indacen-1-yl)dimethylsilanetitanium 1,4-diphenyl-1,3-butadiene, and (tert-butylamido)(3,4-cyclopenta(1)phenanthren-2-yl)dimethylsilane-titanium 1,4-diphenyl-1,3-butadiene. The Group 4 metal complex is preferably selected from (t-butylamido)-(tetramethyl-$\eta^5$-cyclopentadienyl)-dimethylsilanetitanium $\eta^4$-3-methyl-1,3-pentadiene and $C_5Me_4SiMe_2NtBu)Ti(\eta^4$-1,3-pentadiene).

Bis(L) containing complexes including bridged complexes suitable for use in the present invention include: biscyclopentadienylzirconiumdimethyl, biscyclopentadienyl-titaniumdiethyl, biscyclopentadienyltitaniumdiisopropyl, biscyclopentadienyltitanium-diphenyl, biscyclopentadienylzirconium dibenzyl, biscyclopentadienyltitanium-2,4-pentadienyl, biscyclopentadienyl-titaniummethylmethoxide, biscyclopentadienyltitanium-methylchloride, bispentamethylcyclo-pentadienyltitaniumdimethyl, bisindenyltitanium-dimethyl, indenylfluorenyltitaniumdiethyl, bisindenyltitaniummethyl (2-(dimethylamino)-benzyl), bisindenyltitanium methyltrimethylsilyl, bistetrahydroindenyl-titanium methyltrimethylsilyl, bispentamethylcyclopentadienyltitaniumdiisopropyl, bispentamethylcyclopentadienyltitaniumdibenzyl, bispentamethylcyclopentadienyl-titaniummethylmethoxide, bispentamethylcyclopentadienyltitaniummethylchloride, (dimethylsilyl-bis-cyclopentadienyl)zirconiumdimethyl, (dimethylsilyl-bis-pentamethyl-cyclopentadienyl)titanium-2,4-pentadienyl, (dimethylsilyl-bis-t-butylcyclopentadienyl)-zirconiumdichloride, (methylene-bis-pentamethylcyclopentadienyl)titanium (III) 2-(dimethylamino)benzyl, (dimethylsilyl-bis-indenyl)zirconiumdichloride, (dimethylsilyl-bis-2-methylindenyl)zirconiumdimethyl, (dimethylsilyl-bis-2-methyl-4-phenylindenyl)-zirconiumdimethyl, (dimethylsilyl-bis-2-methylindenyl)-zirconium-1,4-diphenyl-1,3-butadiene, (dimethylsilyl-bis-2-methyl-4-phenylindenyl)zirconium (II) 1,4-diphenyl-1,3-butadiene, (dimethylsilyl-bis-tetrahydroindenyl)zirconium (II) 1,4-diphenyl-1,3-butadiene, (dimethylsilyl-bis-fluorenyl)zirconiumdichloride, (dimethylsilyl-bis-tetrahydrofluorenyl)-zirconium-di(trimethylsilyl), (isopropylidene)(cyclopentadienyl)(fluorenyl)-zirconiumdibenzyl, and (dimethylsilylpentamethylcyclopentadienylfluorenyl)-zirconiumdimethyl.

The foregoing metal complexes can be prepared by use of well known synthetic techniques. Optionally a reducing agent can be employed to produce the lower oxidation state complexes. Such a process is disclosed in U.S. Ser. No. 8/241,523, filed May 13, 1994, published as WO95-00526, the teachings of which are hereby incorporated by reference, and in WO 98/27103 and PCT/US97/07252 (previously incorporated by reference). The syntheses are conducted in a suitable non-interfering solvent at a temperature from −100 to 300° C., preferably from −78 to 100° C., most preferably from 0 to 50° C. By the term "reducing agent" herein is meant a metal or compound which, under reducing conditions causes the metal M, to be reduced from a higher to a lower oxidation state. Examples of suitable metal reducing agents are alkali metals, alkaline earth metals, aluminum and zinc, alloys of alkali metals or alkaline earth metals such as sodium/mercury amalgam and sodium/potassium alloy. Examples of suitable reducing agent compounds are group 1 or 2 metal hydrocarbyl compounds having from 1 to 20 carbons in each hydrocarbyl group, such as, sodium naphthalenide, potassium graphite, lithium alkyls, lithium or potassium alkadienyls; and Grignard reagents. Most preferred reducing agents are the alkali metals or alkaline earth metals, especially lithium and magnesium metal.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Mixtures of catalyst complexes, coordination complexes or both may be used in the process aspect of the present invention. For example, a coordination complex described in WO 98/27103 and PCT/US97/07252 may be used in combination with a catalyst complex like that described in, for example, U.S. Pat. No. 5,470,993. Similarly, a combination of two or more of the coordination complexes that are disclosed in WO 98/27103 and PCT/US97/07252 or two or more of the catalyst complexes disclosed in U.S. Pat. No. 5,470,993 also produces acceptable results.

The foregoing description of catalyst complexes is illustrative, but non-limiting. It is believed that any catalyst that promotes vinyl end group termination under polymerization conditions together with subsequent reinsertion into a polymer chain would be satisfactory so long as the resulting polymer has a PRR of at least four.

The complexes, whether they are catalyst complexes, coordination complexes or both, are rendered catalytically active by combining them with an activating cocatalyst or by use of an activating technique. Suitable activating cocatalysts for use herein include polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbon atoms in each hydrocarbyl or halogenated hydrocarbyl group, more especially perfluorinated tri(aryl) boron compounds, and most especially tris (pentafluorophenyl)borane (hereinafter "FAB").

As an alternative, the complexes are rendered catalytically active by combining them with non-polymeric, compatible, non-coordinating, ion forming compounds (including the use of such compounds under oxidizing conditions), especially the use of ammonium-, phosphonium-, oxonium-, carbonium-, silylium- or sulfonium-salts of compatible, non-coordinating anions, or ferrocenium salts of compatible, non-coordinating anions; and combinations of the foregoing activating cocatalysts and techniques. The foregoing activating cocatalysts and activating techniques have been previously taught with respect to different metal complexes in the following references: EP-A-277,003, U.S. Pat. Nos. 5,153,157, 5,064,802, EP-A-468,651 (equivalent to U.S. Ser. No. 07/547,718), EP-A-520,732 (equivalent to U.S. Ser. No. 07/876,268), and EP-A-520,732 (equivalent to U.S. Ser. No. 07/884,966 filed May 1, 1992), the teachings of which are incorporated herein by reference.

Combinations of neutral Lewis acids, especially the combination of a trialkyl aluminum compound having from 1 to 4 carbon atoms in each alkyl group and a halogenated tri(hydrocarbyl)boron compound having from 1 to 20 carbon atoms in each hydrocarbyl group, especially FAB, further combinations of such neutral Lewis acid mixtures with a polymeric or oligomeric alumoxane, and combinations of a single neutral Lewis acid, especially FAB with a polymeric or oligomeric alumoxane are especially desirable activating cocatalysts. Preferred molar ratios of Group 4 metal complex:FAB:alumoxane are from 1:1:1 to 1:5:20, more preferably from 1:1:1.5 to 1:5:10. The use of lower levels of alumoxane in the process of the present invention allows for production of EAODM polymers with high catalytic efficiencies using less of the expensive alumoxane cocatalyst. Additionally, polymers with lower levels of aluminum residue, and hence greater clarity, are obtained.

A further suitable ion forming, activating cocatalyst comprises a compound which is a salt of a silylium ion and a non-coordinating, compatible anion represented by the formula: $R_3Si(X')_q{}^+A^-$ wherein: R is $C_{1-10}$ hydrocarbyl, and X', q and $A^-$ are as previously defined.

Preferred silylium salt activating cocatalysts are trimethylsilylium tetrakispentafluoro-phenylborate, triethylsilylium tetrakispentafluorophenylborate and ether substituted adducts thereof. Silylium salts have been previously generically disclosed in J. Chem Soc. Chem. Comm., 1993, 383–384, as well as Lambert, J. B., et al., Organometallics, 1994, 13, 2430–2443. The use of the above silylium salts as activating cocatalysts for addition polymerization catalysts is disclosed in U.S. Ser. No. 304,314, filed Sep. 12, 1994, published in equivalent form as WO96/08519 on Mar. 21, 1996, the teachings of which are herein incorporated by reference.

Certain complexes of alcohols, mercaptans, silanols, and oximes with FAB are also effective catalyst activators and may be used according to the present invention. Such cocatalysts are disclosed in U.S. Pat. No. 5,296,433, the teachings of which are herein incorporated by reference.

The technique of bulk electrolysis involves the electrochemical oxidation of the metal complex under electrolysis conditions in the presence of a supporting electrolyte comprising a non-coordinating, inert anion. The technique is more fully explained at column 15, line 47 through column 16, line 48 of previously incorporated U.S. Pat. No. 5,624,878.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis (calculated on moles of aluminum (Al)). FAB, when used as an activating cocatalyst, is employed in a molar ratio to the metal complex of form 0.5:1 to 10:1, more preferably from 1:1 to 6:1 most preferably from 1:1 to 5:1. The remaining activating cocatalysts are generally employed in approximately equimolar quantity with the metal complex.

In general, polymerization may be accomplished at conditions well known in the art for Ziegler-Natta or Kaminsky-Sinn type polymerization reactions, that is, temperatures from 0–250° C., preferably 30 to 200° C. and pressures from atmospheric to 10,000 atmospheres. See, e.g., Kaminsky, J. Poly. Sci., Vol. 23, pp. 2151–64 (1985) reporting the use of a soluble bis(cyclopentadienyl)zirconium dimethyl-alumoxane catalyst system for solution polymerization of EP and EAODM elastomers. U.S. Pat. No. 5,229,478 discloses a slurry polymerization process utilizing similar bis (cyclopentadienyl)zirconium based catalyst systems.

Suspension, solution, slurry, gas phase, solid state powder polymerization or other process condition may be employed if desired. A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30. In most polymerization reactions, the molar ratio of catalyst:polymerizable compounds employed is from $10^{-12}$:1 to $10^{-1}$:1, more preferably from $10^{-9}$:1 to $10^{-5}$:1. The process used to prepare the EAODM interpolymers of the present invention may be either a solution or slurry process, both of which are previously known in the art.

Inert liquids are suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 1-hexane, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure and used herein.

The catalysts may be utilized in combination with at least one additional homogeneous or heterogeneous polymerization catalyst in separate reactors connected in series or in parallel to prepare polymer blends having desirable properties. An example of such a process is disclosed in WO 94/00500, equivalent to U.S. Ser. No. 07/904,770, as well as U.S. Ser. No. 08/10958, filed Jan. 29, 1993, the teachings of which are incorporated herein by reference.

By using the foregoing catalysts, catalyst complexes and coordination complexes in combination with cocatalysts in the process of one aspect of the present invention, the interpolymers of another aspect of the present invention are readily prepared. The resulting EAO(D)M interpolymers exhibit a PRR of at least 4 without incorporating NBD or another conventional LCB monomer. The interpolymers exhibit improved polymer processibility (which can include a higher throughput rate), higher melt strength, higher green strength, reduced die swell, resistance to melt fracture and extendibility with fillers relative to interpolymers that have a linear polymer backbone, but no LCB.

The catalysts used in the process of the present invention are particularly advantageous for the production of interpolymers that have a PRR of at least 4. The use of the catalysts in continuous polymerization processes, especially continuous solution polymerization processes, allows for elevated reactor temperatures that favor the formation of vinyl terminated polymer chains that may be incorporated into a growing polymer, thereby giving a long chain branch. It is believed that the unique combination of elevated reactor temperatures, high ethylene conversion and either the substantial absence or very low levels of molecular hydrogen yield the desired interpolymers of the first aspect of the invention. "Very low levels", as used herein, means a level of more than zero, but less than or equal to 0.1, mole percent, based upon fresh ethylene feed content plus fresh hydrogen feed content.

In general terms, it is desirable to produce EAODM elastomers under conditions of increased reactivity of the diene monomer component. The reason for this was explained in the above identified '478 patent in the following manner, which still remains true despite the advances attained in such reference. A major factor affecting production costs and hence the utility of an EAODM is diene monomer cost. The diene is a more expensive monomer material than $C_2$ or $C_3$. Further, the reactivity of diene monomers with previously known metallocene catalysts is lower than that of $C_2$ and $C_3$. Consequently, to achieve the requisite degree of diene incorporation to produce an EAODM with an acceptably fast cure rate, it has been necessary to use a diene monomer concentration which, expressed as a percentage of the total concentration of monomers present, is in substantial excess compared to the percentage of diene desired to be incorporated into the final EAODM product. Since substantial amounts of unreacted diene monomer must be recovered from the polymerization reactor effluent for recycle the cost of production is increased unnecessarily.

Further adding to the cost of producing an EAODM is the fact that, generally, the exposure of an olefin polymerization catalyst to a diene, especially the high concentrations of diene monomer required to produce the requisite level of diene incorporation in the final EAODM product, often reduces the rate or activity at which the catalyst will cause polymerization of ethylene and propylene monomers to proceed. Correspondingly, lower throughputs and longer reaction times have been required, compared to the production of an ethylene-propylene copolymer elastomer or other $\alpha$-olefin copolymer elastomer.

The EAO(D)M polymers of the present invention may, as noted above, also be prepared by gas phase polymerization, another well known process wherein reactor cooling typically occurs via evaporative cooling of a volatile material such as a recycle gas, an inert liquid or a monomer or optional diene that is used to prepare the EAO(D)M polymer. A suitable inert liquid is a $C_{3-8}$, preferably a $C_{4-6}$, saturated hydrocarbon monomer. The volatile material or liquid evaporates in the hot fluidized bed to form a gas that mixes with the fluidizing gas. This type of process is described, for example in EP 89691; U.S. Pat. No. 4,543,399; WO 94/25495; WO 94/28032; and U.S. Pat. No. 5,352,749, the teachings of which are hereby incorporated by reference. Other relevant teachings, also incorporated by reference, are found in U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,541,270; EP-A-659,773; EP-A-692,500; and PCT Applications WO 94/29032, WO 94/25497, WO 94/25495, WO 94/28032; WO 95/13305; WO 94/26793; and WO 95/07942.

The polymerization reaction occurring in the gas fluidized bed is catalyzed by the continuous or semi-continuous addition of catalyst. Such catalyst can be supported on an inorganic or organic support material.

The gas phase processes suitable for the practice of this invention are preferably continuous processes that provide for a continuous supply of reactants to the reaction zone of the reactor and the removal of products from the reaction zone of the reactor, thereby providing a steady-state environment on the macro scale in the reaction zone of the reactor.

In contrast, solution polymerization conditions use a solvent for the respective components of the reaction. Preferred solvents include mineral oils and the various hydrocarbons that are liquid at reaction temperatures. Illustrative examples of useful solvents include alkanes such as pentane, iso-pentane, hexane, heptane, octane and nonane, as well as mixtures of alkanes including kerosene and Isopar E™, available from Exxon Chemicals Inc.; cycloalkanes such as cyclopentane and cyclohexane; and aromatics such as benzene, toluene, xylenes, ethylbenzene and diethylbenzene.

At all times, the individual ingredients as well as the recovered catalyst components should be protected from oxygen and moisture. Therefore, the catalyst components and catalysts should be, and preferably are, prepared and recovered in an oxygen and moisture free atmosphere. Preferably, therefore, the reactions are performed in the presence of an dry, inert gas such as, for example, nitrogen.

Ethylene is added to a reaction vessel in an amount sufficient to maintain a differential pressure in excess of the combined vapor pressure of the $\alpha$-olefin and diene monomers. The $C_2$ content of the polymer is determined by the ratio of $C_2$ differential pressure to the total reactor pressure. Generally, polymerization occurs with a differential pressure of $C_2$ of from 10 to 1500 pounds per square inch (psi) (70 to 10500 kPa), most preferably from 40 to 800 psi (280 to 5600 kPa). The polymerization temperature is suitably from 70 to 225° C., preferably from 80 to 170° C., and most preferably from greater than 80 to 140° C.

The polymerization reaction is desirably conducted under conditions sufficient to attain an ethylene conversion of at least 60 wt %, based upon amount of ethylene fed to a reactor. The ethylene conversion is preferably above 65 wt %, more preferably above 70 wt %. The polymer concentration in the reactors under steady state conditions solution process is desirably from 5 to 25 wt %, preferably from 8 to 25 wt % and most preferably from 10 to 20 wt %. Solution process polymer concentrations in excess of 25 wt % may be used provided the resulting polymer solution has a solution viscosity that favors further processing. Processes other than a solution process, such as slurry or gas phase processes, have different, but readily determined, polymer concentration limits.

Polymerization may occur in either a batch or a continuous polymerization process using one or more reactors. Polymerization preferably occurs via a continuous process so that catalyst, ethylene, α-olefin, diene and optional solvent are continuously supplied to the reaction zone and polymer product continuously removed therefrom.

Without limiting in any way the scope of the invention, one means for carrying out such a polymerization process uses a stirred-tank reactor into which α-olefin monomer is introduced continuously together with solvent, diene monomer and $C_2$ monomer. The reactor contains a liquid phase composed substantially of $C_2$, $C_3$ and diene (also known as "polyene") monomers together with any solvent or additional diluent. If desired, a small amount of a traditional LCB inducing diene such as NBD, 1,7-octadiene or 1,9-decadiene may also be added so long as it does not adversely affect desirable polymer properties. Catalyst and co-catalyst are continuously introduced in the reactor liquid phase. The reactor temperature and pressure may be controlled by adjusting the solvent/monomer ratio, the catalyst addition rate, and by use of cooling or heating coils, jackets or both. The rate of catalyst addition controls the polymerization rate. Manipulating the respective feed rates of ethylene, α-olefin and diene to the reactor provides control over ethylene content of the polymer product. Polymer product molecular weight control follows from controlling other polymerization variables such as the temperature, monomer concentration, or introducing a stream of hydrogen into the reactor. The reactor effluent is contacted with a catalyst kill agent such as water. The polymer solution is optionally heated, and the polymer product is recovered by flashing off gaseous ethylene and propylene as well as residual diene and residual solvent or diluent at reduced pressure, and, if necessary, conducting further devolatilization in equipment such as a devolatilizing extruder. In a continuous process, the mean residence time of the catalyst and polymer in the reactor generally is from 5 minutes to 8 hours, and preferably from 10 minutes to 6 hours.

In a preferred manner of operation, the polymerization is conducted in a continuous solution polymerization system comprising two reactors connected in series or parallel. In one reactor, a relatively high molecular weight product ($M_w$ from 50,000 to 1,000,000, more preferably from 100,000 to 500,000) is formed in the absence of hydrogen while, in the second reactor, a product of a relatively low molecular weight ($M_w$ 20,000 to 300,000) is formed. The presence of hydrogen in the second reactor is optional. As an alternative, the same molecular weight product can be produced in each of the two reactors. The final product is a blend of the two reactor effluents that are combined prior to devolatilization to result in a uniform blend of the two polymer products. Such a dual reactor process allows for the preparation of products having improved properties. In a preferred embodiment, the reactors are connected in series, that is effluent from the first reactor is charged to the second reactor and fresh monomer, solvent and hydrogen are added to the second reactor. Reactor conditions are adjusted such that the weight ratio of polymer produced in the first reactor to that produced in the second reactor is from 20:80 to 80:20. If desired, however, a broader range of weight ratios may be used. If desired also a use of different catalyst systems for each reactor may be employed. For example, a metallocene based catalyst system utilizing process conditions outlined earlier in one reactor and a conventional Ziegler-Natta or another type of metallocene based catalyst system in the second reactor which may or may utilize the outlined process conditions. In addition, the temperature of the second reactor is controlled to produce the lower $M_w$ product. This system beneficially allows for production of EAODM products having a large MV range, as well as excellent strength and processibility. Although this preferred manner of operation employs two reactors, three or more reactors may also be used.

EXAMPLES

The following examples illustrate but do not, either explicitly or by implication, limit the present invention. Unless otherwise stated, all parts and percentages are expressed on a weight basis.

Physical property evaluation of EAODM polymers uses a number of standard tests. The tests include MV, compositional analysis via Fourier transform infrared analysis (FTIR) (ASTM D3900), and density (ASTM D-792). Other definitive properties include rheology ratio, determined as described below, and PRR, determined as described above RR ($V_{0.1}/V_{100}$) is determined by examining samples using melt rheology techniques on a Rheometric Scientific, Inc. ARES (Advanced Rheometric Expansion System) dynamic mechanical spectrometer (DMS). The samples are examined at 190° C. using the dynamic frequency mode and 25 millimeter (mm) diameter parallel plate fixtures with a 2 mm gap. With a strain rate of 8% and an oscillatory rate that is incrementally increased from 0.1 to 100 rad/sec, 5 data points taken for each decade of frequency analyzed. Each sample (either pellets or bale) is compression molded into 3 inch (1.18 centimeter (cm)) plaques ⅛ inch (0.049 cm) thick at 20,000 psi (137.9 megapascals (MPa)) pressure for 1 minute at 180° C. The plaques are quenched and cooled (over a period of 1 minute) to room temperature. A 25 mm plaque is cut from the center portion of the larger plaque. These 25 mm diameter aliquots are then inserted into the ARES at 190° C. and allowed to equilibrate for 5 minutes prior to initiation of testing. The samples are maintained in a nitrogen environment throughout the analyses to minimize oxidative degradation. Data reduction and manipulation are accomplished by the ARES2/A5:RSI Orchestrator Windows 95 based software package. RR measures the ratio of the viscosity versus shear rate curve.

Interpolymer MV ($ML_{1+4}$ at 125° C.) is measured in accordance with American Society for Testing and Materials test D1646-94 (ASTM D1646-94). The PRR is calculated from the MV and the RR in accordance with the formula provided above.

Polymer MWD is determined by gel permeation chromatography (GPC) using a Millipore/Waters 150-C ALC/GPC chromatograph. A 0.10 milligram (mg) interpolymer sample is added to 50.0 milliliter (ml) of 1,2,4-trichlorobenzene and heated at 160° C. for 2 hours. After this, a 5 ml aliquot is dispensed into a 1 dram (0.37 centiliter) autosampler vial and loaded into the instrument sample chamber via a 16 position carousel. After equilibrating for 90 minutes at 130° C. within the chromatograph, a 100 microliter sample aliquot is injected onto the Polymer Labs PLgel® 10 micrometer Mixed-B 900×7.5 millimeter GPC column under conditions sufficient to provide an elution time of 60 minutes at a flow rate of 1 ml per minute. A Millipore/Waters Differential Refractive Index detector is used to measure the concentration response of the effluent. TriSec v2.7 software is used to effect data acquisition, reduction and manipulation with calibration based on NBS traceable Polystyrene standards.

Catalyst efficiency (Cat. Eff.) is specified in terms of million pounds of polymer per pound of Group IV metal in the catalyst (MM#/#). For the batch process, it is determined by weighing the polymer product and dividing by the amount of Group IV metal added to the reactor. For a continuous process, polymer product weight is determined by measured ethylene or vent conversion.

Example 1–3

Three sample ethylene/propylene/ENB interpolymer compositions, all representing the present invention, are prepared using a single loop reactor that is designed for the continuous addition of reactants and continuous removal of polymer solution. Devolatilization and polymer recovery follow removal of polymer solution from the reactor. The catalyst, cocatalyst and scavenger for the Examples 1 and 2 are, respectively, (t-butylamido)-dimethyl ($\eta^5$-2-methyl-s-indacen-1-yl)silanetitanium(II) 1,3-pentadiene, FAB and MMAO (triisobutyl aluminum modified methylalumoxane). See Example 3 of PCT/US97/07252 (previously incorporated by reference) for details about preparation of this catalyst. The catalyst for Example 3 is (tetramethylcyclopentadienyl)dimethyl (t-butylamido)-silanetitanium 1,3-pentadiene. Example 1 uses a reactor temperature of 120° C. and an ethylene conversion of 92.3% to obtain an interpolymer product. Example 2 uses a reactor temperature of 126° C. and an ethylene conversion of 86.1% to obtain an interpolymer product. Neither Example employs a flow of gaseous hydrogen ($H_2$). Examples 1 and 2 both use a pressure of 473 pounds per square inch gauge (psig) (3.26 megapascals (MPa)). Example 3 has a H2 flow rate of 10 standard cubic centimeters per minute (sccm) and uses a pressure of 795 psig (5.5 MPa) and a reactor temperature of 101° C.

The interpolymers are prepared using the procedure outlined in Example 4 of PCT/US97/07252 (previously incorporated by reference) as modified for Example 3 only to reflect the absence of hydrogen. As such, ethylene and propylene are combined into one stream before being introduced into a diluent mixture that comprises a mixed alkane solvent (Isopar-E™, available from Exxon Chemicals Inc.) and ENB to form a combined feed mixture. The combined feed mixture is continuously injected into the reactor. The catalyst and a blend of the cocatalyst and scavenging compound are combined into a single stream that is also continuously injected into the reactor.

Table IA shows flow rates for solvent, $C_2$, propylene ($C_3$) and ENB in pounds per hour (pph). Table IA also shows concentrations of catalyst (Cat) in parts per million (ppm) cocatalyst (Cocat) in ppm and scavenger (Scav) in ppm flow rates, in pph, for Cat, Cocat (FAB) and Scav (MMAO).

Table IB shows catalyst efficiency, a ratio of cocat to metal (M), where M is titanium (Ti), a ratio of scavenger:titanium (Scav/Ti) and polymer properties (MV and EAODM composition (as determined by FTIR)), RR, PRR, $M_w$, and MWD. The $C_2$ conversions for Examples 1–3 are, respectively, 92.3 wt %, 86.1 wt % and 83 wt %.

A reactor exit stream is continuously introduced into a separator, where molten polymer is continuously separated from the unreacted comonomer, unreacted ethylene, unreacted ENB, and solvent. An underwater pelletizer converts molten polymer into solid pellets.

TABLE IA

| Ex No | Solvent Flow (pph) | $C_2$ Flow (pph) | $C_1$ Flow (pph) | ENB Flow (pph) | Cat Conc (pph) | Cocat Conc (pph) | Scav Conc (pph) | Cat flow (pph) | Cocat flow (pph) | Scavenger flow (pph) |
|---|---|---|---|---|---|---|---|---|---|---|
| 1 | 244 | 32.1 | 15 | 0.16 | 0.54 | 23.2 | 1.52 | 0.76 | 0.81 | 0.53 |
| 2 | 235 | 34.5 | 17.7 | 0.25 | 0.39 | 16.4 | 1.07 | 0.5 | 0.52 | 0.16 |
| 3 | 67,800 | 8610 | 4230 | 104 | 1.0 | 6.2 | 0.6 | 27.3 | 16.1 | 21.5 |

TABLE IB

| Ex No | Cat Eff (MM#/#) | FAB/Ti Ratio | Scav/Ti Ratio | RR | PRR | MV | $C_3$ (wt %) | ENB (wt %) | MW ($M_w$) | MWD |
|---|---|---|---|---|---|---|---|---|---|---|
| 1 | 0.314 | 3.99 | 4.98 | 41 | 34.7 | 24.8 | 28.7 | 0.44 | 100,100 | 2.53 |
| 2 | 0.454 | 4.97 | 4.97 | 30 | 23.2 | 26.5 | 28.8 | 0.43 | 113,000 | 2.3 |
| 3 | 1.1 | 5 | 3 | 48.1 | 35.8 | 44.7 | 30 | 0.68 | 152,800 | 2.3 |

The data presented in Examples 1–3 illustrate several points. First, a polymer with an acceptable PRR can be produced either in the substantial absence of hydrogen (Examples 1 and 2) or in the presence of very small amounts of hydrogen (Example 3). Second, satisfactory PRR values can be obtained at varying interpolymer MWs. Third, as shown in Examples 1 and 2, ethylene conversion percentage affects interpolymer PRR, with higher conversion (Example 1) yielding a higher PRR. It is believed that conditions that minimize vinyl end group formation (also known as "vinyl termination"), such as lower polymerization temperatures (less than 70° C.), higher levels of hydrogen (greater than 0.1 mole %), or both lead to an interpolymer PRR of less than 4.

Example 4

An EPDM interpolymer is prepared using a dual reactor (a first reactor connected to a second reactor in series) configuration rather than the single reactor of Examples 1–3. Each reactor is designed and configured in the same manner as the single reactor except that polymer recovery follows the second reactor. Polymer preparation in the first reactor follows the procedure used for the single reactor with different parameters, but without polymer recovery. As in Examples 1 and 2, there is no hydrogen flow in the first reactor. The parameters are as follows: $C_2$ feed rate of 22.9 pph, $C_3$ feed rate of 9.3 pph, ENB feed rate of 0.08 pph, reactor temperature of 114° C., catalyst flow rate of 0.57 pph, cocatalyst (cocat or FAB) flow rate of 0.72 pph, scavenger (scav or MMAO) flow rate of 0.56 pph, FAB/Ti (cocat/Ti) ratio of 3.98, Scav/Ti ratio of 3.98 and $C_2$ conversion of 92.9%. The catalyst efficiency is 0.295 MM#/#. The reactor pressure is 475 psig (3.28 MPa).

Product from the first reactor enters the second reactor where it encounters a new set of parameters that includes a flow of gaseous hydrogen ($H_2$). The parameters are as follows: $C_2$ feed rate of 8.2 pph, $C_3$ feed rate of 3.9 pph, ENB feed rate of 0.03 pph, $H_2$ feed rate of 364 sccm (0.018 mole% $H_2$, based on moles of fresh $H_2$ in the feed divided by moles of fresh $H_2$ in the feed plus moles of fresh $C_2$ in the feed), reactor temperature of 110° C., catalyst flow rate of 0.41 pph, FAB flow rate of 0.51 pph, MMAO flow rate of 0.48 pph, cocat/Ti ratio of 3.77, Scav/Ti ratio of 4.94 and $C_2$ conversion of 82.6%. The reactor pressure is the same as in the first reactor. The catalyst efficiency is 0.315 MM#/#. The resulting polymer has a propylene content of 28.1% and an ENB content of 0.55%, both percentages being based on resulting polymer weight, an overall MV of 22.9, an overall $M_w$ of 109,100, an overall MWD of 2.85, a RR of 42 and a PRR of 36.3. A sample of the polymer solution from the first reactor, upon analysis, shows a PRR of 76 and a MV, extrapolated from $M_w$, of 40.

The reactor split between the first and second reactor is 59:41, meaning that 59% of the interpolymer is made in the first reactor). As first conditions in the first reactor favor LCB formation, 59% of the interpolymer contains LCB.

Example 4, like Examples 1–3, illustrates several points. First, interpolymers of the present invention can be made in a dual reactor configuration, even when conditions favoring a PRR of four or more are present in only one of the two reactors. Skilled artisans recognize, however, that attaining a product from the second reactor with a PRR of at least four necessarily requires that the polymer produced in the first reactor have a correspondingly higher PRR. Second, a broadened MWD, due to a dual reactor configuration, has no adverse impact upon interpolymer PRR.

Example 5 and Comparative Example A

Example 4 is replicated using the conditions shown in Table IIA–IID.

TABLE IIA

| Ex ID Re- | $C_2$ Feed (pph) | | $C_1$ Feed (pph) | | ENB Feed (pph) | | $H_2$ Flow (sccm) | | Reactor Temp (° C.) | |
|---|---|---|---|---|---|---|---|---|---|---|
| actor | 1 | 2 | 1 | 2 | 1 | 2 | 1 | 2 | 1 | 2 |
| 5 | 4286 | 4004 | 6397 | 5877 | 63.1 | 50.7 | 3 | 8 | 84 | 86 |
| A | 6449 | 6270 | 9457 | 8297 | 93.6 | 82 | 20 | 23 | 79.6 | 81.7 |

TABLE IIB

| Ex ID | Cat Flow (pph) | | Cocat Flow (pph) | | Scav Flow (pph) | | $C_2$ Conversion (wt %) | | Reactor Pressure (psig/MPa) | |
|---|---|---|---|---|---|---|---|---|---|---|
| Reactor | 1 | 2 | 1 | 2 | 1 | 2 | 1 | 2 | 1 | 2 |
| 5 | 32.4 | 25.6 | 16.1 | 12.7 | 18.7 | 14.9 | 67 | 55 | 801/5.52 | 852/5.87 |
| A | 50 | 79.3 | 45 | 37 | 50 | 59 | 74 | 64 | 737/5.08 | 745/5.14 |

TABLE IIC

| Ex ID Re- | $H_2$ (Mole %) | | Cat Eff (MM#/#) | | Cocat/Ti Ratio | | Scav/Ti Ratio | | Reactor % Polymer | |
|---|---|---|---|---|---|---|---|---|---|---|
| actor | 1 | 2 | 1 | 2 | 1 | 2 | 1 | 2 | 1 | 2 |
| 5 | 0.01 | 0.031 | 0.63 | 0.7 | 4 | 4 | 3.5 | 3.5 | 10 | 9.6 |
| A | 0.051 | 0.062 | 0.85 | 0.58 | 5 | 5 | 12 | 8.4 | 12.8 | 13.2 |

TABLE IID

| Ex ID | Overall MV | RR | PRR | $C_3$ (wt %) | ENB (wt %) | $M_w$ | MWD |
|---|---|---|---|---|---|---|---|
| 5 | 30 | 19.19 | 11.3 | 57.3 | 0.4 | 125,900 | 2.2 |
| A | 29 | 11.17 | 3.6 | 57.3 | 0.55 | 129,600 | 2.34 |

A comparison of Example 5 with Comparative Example A illustrates the effect of varying levels of hydrogen. Excess hydrogen, as in Comparative Example A, leads to a PRR of less than 4.

Example 6 and Comparative Example B

A standard wire and cable composition that comprises 100 pbw of EAODM interpolymer, 8 pbw of low density polyethylene (LDPE) (2 dg/min melt index, 0.92 grams per cubic centimeter density, LD-400, Exxon Chemical), 60 pbw of treated clay (vinyl silane-treated aluminum silicate (calcined), Translink® 37, Engelhard), 5 pbw zinc oxide (85% zinc oxide in an EPDM binder, ZnO-85-SG, Rhein-Chemie), 5 pbw lead stabilizer (90% red lead oxide in an EPDM binder, TRD-90, Rhein-Chemie), 5 pbw paraffin wax (melt point of 130–135° F. (54–57° C.) International Waxes, Ltd.), 1 pbw antioxidant (polymerized 1,2-dihydro-2,2,4-trimethyl quinoline, Agerite® Resin D, R. T. Vanderbilt), 1 pbw coupling agent (40% vinyl-tris-(2-methoxy-ethoxy)silane in a wax binder, PAC-473, OSI Specialties) and 3.5 pbw dicumyl peroxide (DiCUP R®, Hercules) is process using a Davis-Standard extruder. For Example 6, the polymer is prepared in the same manner as in Example 4 above, but with a MV of 18 rather than 22. For comparative Example B, the polymer is Nordel® 2722, an ethylene/propylene/1,4-hexadiene/NBD tetrapolymer commercially available from DuPont Dow Elastomers L.L.C. The extruder is a 3.5 inch (8.9 centimeter (cm)) extruder equipped with a barrier screw and mixing tip and having a length to diameter (L/D) ratio of 20:1. The extruder tubing die has an outer diameter of 52.6 millimeters (mm), an inner diameter of 0.375 inch (9.5 mm) and a length of 0.66 inch (16.8 mm). The extruder has a feed zone, three sequential mixing zones, a die head zone and a die zone operating at respective set temperatures of 190° Farenheit (°F.) (88° C.), 190° F. (88° C.), 200° F. (93° C.), 200° F. (93° C.), 225° F. (107° C.), and 225° F. (107° C.). The extruder is cooled with cooling water that has a temperature of 160° F. (71° C.). Table III below shows extruder operating parameters and extrudate properties for Example 6 and Comparative Example B.

TABLE III

| Ex/ Comp Ex | Extruder Speed (RPM) | Extruder Output (lbs/hr//kg/hr) | Extruder Pressure (psi/MPa) | Melt Temp (° F./° C.) | % Load | Extruder Circumference (mm) | % Die Swell |
|---|---|---|---|---|---|---|---|
| B | 20 | 212/96.2 | 2145/14.8 | 248/120 | 40 | 75 | 42 |
| B | 30 | 316/143.3 | 2257/15.6 | 265/129 | 44 | 78 | 48 |
| B | 40 | 423/191.9 | 2300/15.9 | 271/133 | 47 | 78 | 4B |
| 6 | 20 | 214/97.1/ | 1961/13.5 | 246/119 | 35 | 75 | 42 |
| 6 | 30 | 323/146.5 | 2088/14.4 | 265/129 | 40 | 79 | 50 |
| 6 | 40 | 418/189.6 | 2176/15.0 | 279/137 | 43 | 77 | 46 |

The data in Table III show that EPDM interpolymers of the present invention, which do not contain a conventional LCB monomer, provide extrudate properties that are comparable to those of conventional tetrapolymers that do contain a conventional LCB monomer. The data also show that the EPDM interpolymers of the present invention process through the extruder at similar throughput rates, but at lower pressures, than the tetrapolymers.

Example 7

Thermoplastic Elastomer Preparation

A TPE is prepared by combining 63% PP (AccPro® 9934, Amoco Chemical), 27% of an interpolymer prepared as in Example 4, and 10% of a one micrometer talc (Microtuf® AG 101, Specialty Minerals). The interpolymer has a MV of 18, a RR of 29.3 and a PRR of 24.96. The interpolymer is expected to have a MWD of 2.8, based on the other properties. The combination occurs in a 30 mm Werner Pfleiderer twin screw extruder operating at a speed of 200 revolutions per minute (rpm) and a set temperature of 220° C. and produces an extrudate with a temperature of 225° C. The resulting extrudate is molded on a 100 ton (800 kiloNewton) Arburg molding machine using a mold temperature of 83° .F (28° C.) to provide test plaques. Physical property testing of the test plaques yields a variety of data. The samples have a Shore D hardness (ASTM D-2240) at 1 and 10 seconds of, respectively, 62.2 and 58.9. The test plaques yield the following tensile (ASTM D-638) properties when tested at a pull rate of two inches (in) (5.1 cm) per minute: tensile at break of 2599 psi (17.9 MPa); ultimate elongation of 44%; a tensile at yield of 3064 psi (21.1 MPa); and an elongation at yield of 6%. Weld line tensile properties (ASTM D-638, two in/5.1 cm per minute pull rate) are: tensile at break of 1877 psi (12.9 MPa); ultimate elongation of 2%; tensile at yield of 1877 psi (12.9 MPa); and an elongation at yield of 2%. The plaques provide a melt index ($I_2$) (ASTM D-1238, 230° C., 2.16 kg) of 11.49 decigrams per minute (dg/min). When subjected to a three-point flex test (ASTM D-790), testing reveals a flex modulus of 219,273.5 psi (1511.9 MPa) and a 2% secant modulus of 158,680.9 psi (1094.1 MPa). Gloss testing (ASTM D-523) results at angles of incidence of 20°, 60° and 85° are, respectively 26.1, 55.0 and 96.9. Dynatup total energy testing at 23° C. yields a rating of 15.3 foot-pounds (ft-lbs) (20.74 Joules (J)) Izod impact strength test results at 23° C. and −30° C. are, respectively, 0.97 ft-lbs/in and 0.70 ft-lbs/in. Room temperature weldline Izod impact strength is 1.43 ft-lbs/in. (3.0 KJSM (Kilo Joules Square Meters)). The heat distortion at 66 psi (0.46 MPa) is 94.3° C.

Example 8

TPO Preparation

Example 7 is replicated save for using an EO copolymer prepared in a single reactor in place of the interpolymer used in Example 7. The EO copolymer has a MV of 21, a RR of 16 and a PRR of 10.7. The resulting samples have a Shore D hardness at 1 and 10 seconds of, respectively, 65.4 and 61.6. The tensile properties are tensile at break of 2342 psi (16.1 MPa); ultimate elongation of 146%; a tensile at yield of 3309 psi (22.8 MPa); and an elongation at yield of 8%. Weld line tensile properties are tensile at break of 1983 psi (13.7 MPa); ultimate elongation of 2%; tensile at yield of 1978 psi (13.6 MPa); and an elongation at yield of 2%. The plaques provide an $I_2$ of 11.49 dg/min. The flex modulus and 2% secant modulus are, respectively, 209,944.0 psi (1447.5 MPa) and 167,938.0 psi (1157.9 MPa). Gloss testing results at angles of incidence of 20°, 60° and 85° are, respectively 51.5, 71.5 and 91.2. Dynatup testing at 23° C. yields a rating of 20.5 ft-lbs (27.8 J) Izod impact strength testing at 23° C. yields a rating of 2.39 ft-lbs/in (5.0 KJSM). Room temperature weldline Izod impact strength is 1.82 ft-lbs/in. (3.8 KJSM).

Examples 7 and 8 show, respectively, that satisfactory TPEs and TPOs can be prepared using interpolymers of the present invention. Other TPEs, TPOs and TPVs, are suitably prepared consistent with the teachings provided herein.

Example 9

EAO Polymer Preparation

The procedure of Examples 1 and 2 is replicated, save for adding a flow of $H_2$ and changing sparameter and monomers, to produce an EO copolymer. The parameters are as follows: $C_2$ feed rate of 30.4 pph, $C_8$ feed rate of 29.8 pph, $H_2$ feed rate of 10.6 sccm (0.0055 mole%), reactor temperature of 102° C., primary catalyst flow of 0.65 pph, co-cat flow of 0.35 pph, scav flow of 0.69 pph, $C_2$ conversion of 89.8%, reactor pressure of 475 psig (3.28 MPa), catalyst efficiency of 0.78 MM#/#, cocat/Ti molar ratio of 4, and a scav/Ti molar ratio of 5.54. The resulting polymer has a MV of 21.4, RR of 16, PRR of 10.7, MW of 120,300 and MWD of 2.6

Results similar to those presented in Examples 1–9 are expected with other catalysts, cocatalysts, scavengers and process parameters, all of which are disclosed above.

What is claimed is:

1. A process for preparing a shear thinning ethylene/α-olefin interpolymer characterized by a Processing Rheology Ratio (PRR) of at least four, the process comprising: contacting ethylene and at least one α-olefin monomer with a catalyst and an activating cocatalyst under conditions sufficient to attain an ethylene conversion of at least 80 weight percent, the conditions including a temperature of at least 80° C. and, optionally, in the presence of an effective amount of hydrogen, the amount being sufficient to maintain an interpolymer PRR of at least 4, the catalyst being a constrained geometry metal complex, where PRR= (interpolymer Viscosity measured at 190° C. with a shear rate of 0.1 rad/sec)/(interpolymer Viscosity measured at 190° C. with a shear rate of 100 rad/sec)+[3.82− interpolymer Mooney Viscosity ($ML_{1+4}$ @ 125° C.)]×0.3.

2. A process for preparing a shear thinning ethylene/α-olefin/diene interpolymer having a molecular weight distribution of at least 2.3a, Mooney Viscosity ($ML_{1+4}$ @ 125° C.) of at least 15 and a PRR of at least 10, the process comprising: contacting ethylene, at least one α-olefin monomer and at least one diene monomer with a catalyst and an activating cocatalyst under conditions sufficient to attain an ethylene conversion of at least 80 weight percent, the conditions including a temperature of at least 80° C. and, optionally, in the presence of an effective amount of hydrogen, the amount being sufficient to maintain an interpolymer PRR of at least 10, the catalyst being a constrained geometry metal complex.

3. The process of claim 1 or claim 2, wherein the amount of hydrogen is greater than 0 mole percent, but less than 0.10 mole percent, based upon total monomer content plus hydrogen content.

4. The process of claim 1 or claim 2, wherein the amount of hydrogen is greater than 0 mole percent, but less than 0.05 mole percent, based upon total monomer content plus hydrogen content.

5. The process of claim 1 or claim 2, wherein the catalyst is selected from the group consisting of (t-butyl-amido)-dimethyl ($\eta^5$-2-methyl-s-indacen-1-yl)silane-titanium (IV) dimethyl, (t-butylamido)-dimethyl-($\eta^5$-2-methyl-s-indacen-1-yl)silane-titanium (II) 1,3-pentadiene and (t-butylamido) dimethyl-($\eta^5$-2-methyl-s-indacen-1-yl )silane-titanium (II) 2,4-hexadiene or a Group B catalyst selected from (t-butylamido)-dimethyl ($\eta^5$-2,3-dimethylindenyl) silanetitanium (II) 1,4-diphenyl-1,3-butadiene, (t-butyl-amido)-dimethyl($\eta^5$-2,3-dimethyl-s-indacen-1-yl) silanetitanium (IV) dimethyl and mixtures thereof.

6. The process of claim 1 or claim 2, wherein the activating cocatalyst is trispentafluorophenyl borane.

7. The process of claim 1, wherein the interpolymer has an ethylene content of from 20 to 95 weight percent (wt %) and an α-olefin content of from 80 to 5 wt %, the α-olefin being a $C_{3-20}$ α-olefin all percentages based on interpolymer weight and totaling 100 wt %.

8. The process of claim 1 or claim 2, wherein the interpolymer is amorphous.

9. The process of claim 2, wherein the interpolymer has an ethylene content of from 20 to 95 weight percent (wt %), an α-olefin content of from 80 to 5 wt %, the α-olefin being a $C_{3-20}$ α-olefin and, a diene monomer content within a range of from greater than 0 to 25 percent by weight, all percentages based on interpolymer weight and totaling 100 wt %.

* * * * *